(12) United States Patent
Trisnadi et al.

(10) Patent No.: US 8,345,003 B1
(45) Date of Patent: *Jan. 1, 2013

(54) OPTICAL POSITIONING DEVICE USING TELECENTRIC IMAGING

(75) Inventors: Jahja Trisnadi, San Jose, CA (US);
Clinton Carlisle, San Jose, CA (US);
Charles Roxlo, San Jose, CA (US);
David A. Lehoty, San Jose, CA (US)

(73) Assignee: Cypress Semiconductor Corporation, San Jose (*) Notice: Subject to any disclaimer, the term of this patent is extended or adjusted under 35 U.S.C. 154(b) by 0 days.

This patent is subject to a terminal disclaimer.

(21) Appl. No.: 12/843,864

(22) Filed: Jul. 26, 2010

Related U.S. Application Data (63) Continuation of application No. 11/124,858, filed on May 9, 2005, now Pat. No. 7,773,070.

(60) Provisional application No. 60/573,316, filed on May 21, 2004, provisional application No. 60/573,075, filed on May 21, 2004.

(51) Int. Cl.
*G09G 5/08* (2006.01)

(52) U.S. Cl. ........ 345/157; 345/158; 345/160; 345/164; 345/166

(58) Field of Classification Search .............. 345/88, 345/156–166, 179, 207; 250/205, 206.2, 250/208.1, 208.2, 214 R, 221, 222.1, 231.13, 250/559.22–559.32, 332–352; 178/19.05; 356/498, 521, 512; 359/707; 324/95
See application file for complete search history.

(56) References Cited

U.S. PATENT DOCUMENTS

| | | | |
|---|---|---|---|
| 3,922,093 A | | 11/1975 | Dandliker et al. |
| 4,546,347 A | | 10/1985 | Kirsch |
| 4,560,881 A | | 12/1985 | Briggs |
| 4,751,380 A | | 6/1988 | Victor et al. |
| 4,799,055 A | | 1/1989 | Nestler et al. |
| 4,814,553 A | | 3/1989 | Joyce |
| 4,920,260 A | | 4/1990 | Victor et al. |
| 4,936,683 A | | 6/1990 | Purcell |
| 4,967,093 A | * | 10/1990 | Takemori ............... 250/559.2 |
| 5,006,711 A | * | 4/1991 | Hamashima et al. ........ 250/349 |
| 5,061,860 A | * | 10/1991 | Takemori ............... 250/559.23 |
| 5,086,197 A | | 2/1992 | Liou |
| 5,288,993 A | | 2/1994 | Bidiville et al. |
| 5,345,257 A | | 9/1994 | Deguchi et al. |

(Continued)

FOREIGN PATENT DOCUMENTS
WO 9946603 A1 9/1999
(Continued)

OTHER PUBLICATIONS

USPTO Miscellaneous Action for U.S. Appl. No. 11/123,525 dated Jun. 10, 2005; 1 page.

(Continued)

*Primary Examiner* — Prabodh M Dharia (57) ABSTRACT

One embodiment relates to an optical displacement sensor for sensing movement of a data input device across a surface by determining displacement of optical features in a succession of frames. The sensor includes at least an illuminator, telecentric imaging optics on the object (scattering surface) side, and an array of photosensitive elements. The illuminator is configured to illuminate a portion of the surface. The telecentric imaging optics is configured to image the optical features emanating from the illuminated portion of the surface, and the array of photosensitive elements is configured to detect intensity data relating to the optical features imaged by the telecentric imaging optics. Other embodiments are also disclosed.

20 Claims, 5 Drawing Sheets

U.S. PATENT DOCUMENTS

| | | | |
|---|---|---|---|
| 5,345,527 A | 9/1994 | Lebby et al. | |
| 5,391,868 A | 2/1995 | Vampola et al. | |
| 5,473,344 A | 12/1995 | Bacon et al. | |
| 5,578,813 A | 11/1996 | Allen et al. | |
| 5,578,817 A | 11/1996 | Bidiville et al. | |
| 5,606,174 A | 2/1997 | Yoshimura et al. | |
| 5,627,363 A | 5/1997 | Paxman et al. | |
| 5,644,139 A | 7/1997 | Allen et al. | |
| D382,550 S | 8/1997 | Kaneko et al. | |
| D385,542 S | 10/1997 | Kaneko et al. | |
| 5,703,356 A | 12/1997 | Bidiville et al. | |
| 5,729,008 A | 3/1998 | Blalock et al. | |
| 5,729,009 A | 3/1998 | Daendliker et al. | |
| 5,781,229 A | 7/1998 | Zediker et al. | |
| 5,786,804 A | 7/1998 | Gordon | |
| 5,825,044 A | 10/1998 | Allen et al. | |
| 5,854,482 A | 12/1998 | Bidiville et al. | |
| 5,907,152 A | 5/1999 | Daendliker et al. | |
| 5,963,197 A | 10/1999 | Bacon et al. | |
| 5,994,710 A | 11/1999 | Knee et al. | |
| 6,031,218 A | 2/2000 | Piot et al. | |
| 6,034,760 A | 3/2000 | Rees | |
| 6,037,643 A | 3/2000 | Knee | |
| 6,057,540 A | 5/2000 | Gordon et al. | |
| 6,097,371 A | 8/2000 | Siddiqui et al. | |
| 6,151,015 A | 11/2000 | Badyal et al. | |
| 6,172,354 B1 | 1/2001 | Adan et al. | |
| 6,176,143 B1 | 1/2001 | Mo et al. | |
| 6,195,475 B1 | 2/2001 | Beausoleil, Jr. et al. | |
| 6,218,659 B1 | 4/2001 | Bidiville et al. | |
| 6,222,174 B1 | 4/2001 | Tullis et al. | |
| 6,225,617 B1 | 5/2001 | Daendliker et al. | |
| 6,226,092 B1 | 5/2001 | De Lega | |
| 6,233,044 B1 | 5/2001 | Brueck et al. | |
| 6,233,368 B1 | 5/2001 | Badyal et al. | |
| 6,246,050 B1 | 6/2001 | Tullis et al. | |
| 6,255,643 B1 * | 7/2001 | Sayag | 250/221 |
| 6,256,016 B1 | 7/2001 | Piot et al. | |
| 6,281,881 B1 | 8/2001 | Siddiqui et al. | |
| 6,281,882 B1 | 8/2001 | Gordon et al. | |
| 6,304,330 B1 | 10/2001 | Millerd et al. | |
| 6,326,950 B1 | 12/2001 | Liu | |
| 6,330,057 B1 | 12/2001 | Lederer et al. | |
| 6,351,257 B1 | 2/2002 | Liu | |
| 6,396,479 B2 | 5/2002 | Gordon | |
| 6,421,045 B1 | 7/2002 | Venkat et al. | |
| 6,424,407 B1 * | 7/2002 | Kinrot et al. | 356/28 |
| 6,433,780 B1 | 8/2002 | Gordon et al. | |
| 6,452,683 B1 | 9/2002 | Kinrot et al. | |
| 6,455,840 B1 | 9/2002 | Oliver et al. | |
| D464,352 S | 10/2002 | Kerestegian | |
| 6,462,330 B1 | 10/2002 | Venkat et al. | |
| 6,476,970 B1 | 11/2002 | Smith | |
| 6,529,184 B1 | 3/2003 | Julienne | |
| 6,585,158 B2 | 7/2003 | Norskog | |
| 6,603,111 B2 | 8/2003 | Dietz et al. | |
| 6,618,038 B1 | 9/2003 | Bohn | |
| 6,621,483 B2 | 9/2003 | Wallace et al. | |
| 6,642,506 B1 | 11/2003 | Nahum et al. | |
| 6,657,184 B2 | 12/2003 | Anderson et al. | |
| 6,664,948 B2 | 12/2003 | Crane et al. | |
| 6,674,475 B1 | 1/2004 | Anderson | |
| 6,677,929 B2 | 1/2004 | Gordon et al. | |
| 6,703,599 B1 | 3/2004 | Casebolt et al. | |
| 6,707,027 B2 | 3/2004 | Liess et al. | |
| 6,710,855 B2 | 3/2004 | Shiraishi | |
| 6,737,636 B2 | 5/2004 | Dietz et al. | |
| 6,774,351 B2 | 8/2004 | Black | |
| 6,774,915 B2 | 8/2004 | Rensberger | |
| 6,795,056 B2 | 9/2004 | Norskog et al. | |
| 6,809,723 B2 | 10/2004 | Davis | |
| 6,819,314 B2 | 11/2004 | Black | |
| 6,823,077 B2 | 11/2004 | Dietz et al. | |
| 6,825,998 B2 | 11/2004 | Yoshida | |
| 6,869,185 B2 | 3/2005 | Kaminsky et al. | |
| 6,947,459 B2 | 9/2005 | Kurtz et al. | |
| 6,951,540 B2 | 10/2005 | Ebbini et al. | |
| 7,042,575 B2 * | 5/2006 | Carlisle et al. | 356/498 |
| 7,045,763 B2 | 5/2006 | Ballard | |
| 7,098,894 B2 * | 8/2006 | Yang et al. | 345/166 |
| 7,116,427 B2 * | 10/2006 | Baney et al. | 356/498 |
| 7,138,620 B2 * | 11/2006 | Trisnadi et al. | 250/221 |
| 7,161,582 B2 | 1/2007 | Bathiche et al. | |
| 7,189,985 B2 | 3/2007 | Xie et al. | |
| 7,205,521 B2 | 4/2007 | Gruhlke et al. | |
| 7,221,356 B2 | 5/2007 | Oliver et al. | |
| 7,227,531 B2 * | 6/2007 | Lutian | 345/163 |
| 7,248,345 B2 | 7/2007 | Todoroff et al. | |
| 7,268,341 B2 * | 9/2007 | Lehoty et al. | 250/221 |
| 7,285,766 B2 * | 10/2007 | Carlisle et al. | 250/221 |
| 7,292,232 B2 | 11/2007 | Ranta et al. | |
| 7,295,324 B2 | 11/2007 | Jones et al. | |
| 7,423,279 B2 | 9/2008 | Heinz et al. | |
| 7,435,942 B2 | 10/2008 | Lang | |
| 7,505,033 B2 | 3/2009 | Guo et al. | |
| 7,515,280 B2 | 4/2009 | Emtman et al. | |
| 7,746,477 B1 * | 6/2010 | Huber et al. | 356/498 |
| 7,773,070 B2 * | 8/2010 | Trisnadi et al. | 345/157 |
| 2002/0113790 A1 * | 8/2002 | Hayashi | 345/426 |
| 2002/0130835 A1 | 9/2002 | Brosnan | |
| 2002/0145588 A1 | 10/2002 | McCahon et al. | |
| 2002/0158300 A1 | 10/2002 | Gee | |
| 2002/0190953 A1 | 12/2002 | Gordon et al. | |
| 2003/0034959 A1 | 2/2003 | Davis et al. | |
| 2003/0058506 A1 | 3/2003 | Green et al. | |
| 2003/0142288 A1 | 7/2003 | Kinrot et al. | |
| 2004/0000634 A1 | 1/2004 | Ballard | |
| 2004/0084610 A1 | 5/2004 | Leong et al. | |
| 2004/0189593 A1 | 9/2004 | Koay | |
| 2005/0024336 A1 | 2/2005 | Xie et al. | |
| 2005/0024623 A1 | 2/2005 | Xie et al. | |
| 2005/0024624 A1 | 2/2005 | Gruhlke et al. | |
| 2005/0035947 A1 * | 2/2005 | Lutian | 345/166 |
| 2005/0083303 A1 | 4/2005 | Schroeder et al. | |
| 2005/0094154 A1 * | 5/2005 | Baney et al. | 356/499 |
| 2005/0109961 A1 | 5/2005 | Bittner | |
| 2005/0117137 A1 | 6/2005 | Hase | |
| 2005/0156915 A1 * | 7/2005 | Fisher | 345/179 |
| 2005/0228838 A1 | 10/2005 | Stetson et al. | |
| 2005/0258346 A1 | 11/2005 | Lehoty et al. | |
| 2005/0259078 A1 | 11/2005 | Roxlo et al. | |
| 2005/0259097 A1 | 11/2005 | Lehoty et al. | |
| 2005/0259267 A1 * | 11/2005 | Carlisle et al. | 356/498 |
| 2006/0091301 A1 * | 5/2006 | Trisnadi et al. | 250/226 |
| 2006/0106319 A1 * | 5/2006 | Todoroff et al. | 600/476 |
| 2006/0118743 A1 * | 6/2006 | Lang | 250/559.32 |
| 2006/0187209 A1 | 8/2006 | Lai et al. | |
| 2006/0279545 A1 | 12/2006 | Lan et al. | |
| 2007/0057157 A1 * | 3/2007 | Trisnadi et al. | 250/208.2 |
| 2007/0126700 A1 * | 6/2007 | Wright | 345/161 |
| 2007/0165207 A1 * | 7/2007 | Xu et al. | 356/28 |
| 2008/0007526 A1 * | 1/2008 | Xu et al. | 345/163 |
| 2009/0027038 A1 | 1/2009 | Garmire et al. | |

FOREIGN PATENT DOCUMENTS

WO      0248853 A1     6/2002

OTHER PUBLICATIONS

"The Examiner's Grounds for Rejection," from Korean Patent Office for Patent Application No. 10-2006-7026956; Dec. 31, 2007; 4 pages.
USPTO Miscellaneous Action for U.S. Appl. No. 11/123,500 dated Jun. 8, 2005; 1 page.
USPTO Miscellaneous Action for U.S. Appl. No. 11/123,326 dated Jun. 8, 2005; 1 page.
U.S. Appl. No. 11/123,326: Optical Position Sensing Device including Interlaced Groups of Photosensitive Elements, Lehoty et al.; 51 pages, Jun. 8, 2005.
U.S. Appl. No. 11/123,500: "Optical positioning device using different combinations of interlaced photosensitive elements," Lehoty et al.; 49 pages, Jun. 8, 2005.
U.S. Appl. No. 11/123,525: "Optical positioning device with multi-row detector array," Roxlo et al.; 51 pages, Jun. 10, 2005.
U.S. Appl. No. 11/123,527: "Optical positioning device resistant to speckle fading," LeHoty et al.; 52 pages, May 5, 2005.
U.S. Appl. No. 11/128,988: "Speckle sizing and sensor dimensions in optical positioning device;" Carlisle et al.; 27 pages, May 13, 2005.

U.S. Appl. No. 11/129,967: "Optical positioning device having shaped illumination," Carlisle et al.; 27 pages, May 16, 2005.
U.S. Appl. No. 11/261,316: "Two-Dimensional Motion Sensor," Trisnadi et al.; 55 pages, Oct. 28, 2005.
U.S. Appl. No. 11/313,133: "Speckle navigation system;" Spurlock et al.; filed on Dec. 20, 2005; 25 pages.
U.S. Appl. No. 11/582,776: "Two-Dimensional Motion Sensor," Trisnadi et al.; 54 pages, Oct. 18, 2006.
1st Office Action for China Patent Application No. 200580022643.5 dated Jan. 4, 2008; 14 pages.
1st Office Action for Korean Patent Application No. 10-2006-7026821 dated Apr. 28, 2008; 2 pages.
International Search Report of the International Searching Authority dated Feb. 25, 2008 for International Application No. PCT/US06/47802; 2 pages.
USPTO Final Rejection for U.S. Appl. No. 11/129,967 dated May 31, 2007; 8 pages.
International Search Report of the International Searching Authority for Application No. PCT/US2005/017375 dated Oct. 2, 2006; 2 pages.
International Search Report of the International Searching Authority for Application No. PCT/US2005/017462 dated Sep. 14, 2006; 4 pages.
International Search Report of the International Searching Authority for International Application No. PCT/US2005/017459 dated Sep. 26, 2006; 2 pages.
International Search Report of the International Searching Authority for International Application No. PCT/US2005/017461 dated Nov. 23, 2006; 3 pages.
International Written Opinion of the International Searching Authority dated Feb. 25, 2008 for International Application No. PCT/US06/47802; 4 pages.
USPTO Non-Final Rejection for U.S. Appl. No. 11/261,316 dated Jun. 6, 2006; 6 pages.
R E. Kalman, "A New Approach to Linear Filtering and Prediction Problems", Transactions of the ASME-Journal of Basic Engineering, 82 (Series D); Copyright 1960, ASME, pp. 35-45, Research Institute for Advanced Study, Baltimore, MD.
USPTO Miscellaneous Action with SSP for U.S. Appl. No. 11/313,133 dated Dec. 20, 2006; 1 page.
USTPO Non-Final Rejection for U.S. Appl. No. 11/129,967 dated Dec. 6, 2006; 8 pages.
USPTO Non-Final Rejection for U.S. Appl. No. 11/123,527 dated Apr. 9, 2008; 18 pages.
USPTO Non-Final Rejection for U.S. Appl. No. 11/123,525 dated Apr. 14, 2008; 20 pages.
USPTO Non-Final Rejection for U.S. Appl. No. 11/123,500 dated Apr. 11, 2008; 17 pages.
USPTO Non-Final Rejection for U.S. Appl. No. 11/123,326 dated Mar. 21, 2007; 6 pages.
USPTO Non-Final Rejection for U.S. Appl. No. 11/313,133 dated Jan. 5, 2009; 7 pages.
USPTO Non-Final Rejection for U.S. Appl. No. 11/313,133 dated Jul. 7, 2009; 8 pages.
USPTO Non-Final Rejection for U.S. Appl. No. 11/582,776 dated Sep. 10, 2007; 8 pages.
Written Opinion of the International Searching Authority for International Application No. PCT/US05/17462 dated Sep. 14, 2006; 6 pages.
USPTO Notice of Allowance for U.S. Appl. No. 11/582,776 dated May 16, 2008; 6 pages.
USPTO Notice of Allowance for U.S. Appl. No. 11/313,133 dated Dec. 23, 2009; 4 pages.
USPTO Notice of Allowance for U.S. Appl. No. 11/261,316 dated Aug. 23, 2006; 6 pages.
USPTO Notice of Allowance for U.S. Appl. No. 11/129,967 dated Aug. 6, 2007; 4 pages.
USPTO Notice of Allowance for U.S. Appl. No. 11/128,988 dated Feb. 2, 2006; 7 pages.
USPTO Notice of Allowance for U.S. Appl. No. 11/123,326 dated Jul. 9, 2007; 4 pages.
U.S. Appl. No. 11/124,858: "Optical positioning device using telecentric imaging ," Trisnadi et al.; 31 pages.
U.S. Appl. No. 60/573,062: "Speckle-based optical position sensing device having speckle size matched to a sensor dimension," Carlisle, filed on May 21, 2004; 51 pages.
U.S. Appl. No. 60/573,394: "Optical position sensing device having shaped illumination," Clinton B. Carlisle, filed on May 21, 2004; 53 pages.
Foreign Office Action for Application No. 05749412.2 dated Jan. 24, 2011; entire document.
Foreign Office Action for Application No. 200580022643.5 dated Jan. 4, 2008; entire document.
Foreign Office Action for Application No. 200580024624.6 dated Feb. 15, 2008; entire document.
Foreign Office Action for Application No. 2007-527424 dated Nov. 25, 2008; entire document.
Foreign Office Action for Application No. 2007-527528 dated Sep. 29, 2009; entire document.
Foreign Office Action for Application No. 2007-527528 dated Nov. 30, 2010; entire document.
International Search Report and Written Opinion of the International Searching Authority for International Application No. PCT/US05/17983 mailed Jan. 26, 2007; 8 pages.
International Search Report and Written Opinion of the International Searching Authority for International Application No. PCT/US05/17982 mailed Feb. 15, 2006; 6 pages.
USPTO Non-Final Rejection for U.S. Appl. No. 11/124,858 dated Feb. 25, 2009; 23 pages.
USPTO Non-Final Rejection for U.S. Appl. No. 11/124,858 dated Oct. 8, 2008; 17 pages.
USPTO Notice of Allowance for U.S. Appl. No. 11/124,858 dated Jan. 8, 2010; 7 pages.
USPTO Notice of Allowance for U.S. Appl. No. 11/124,858 dated Apr. 2, 2010; 7 pages.
USPTO Notice of Allowance for U.S. Appl. No. 11/124,858 dated Sep. 16, 2009; 9 pages.

* cited by examiner

OPTICAL POSITIONING DEVICE USING TELECENTRIC IMAGING

CROSS-REFERENCE TO RELATED APPLICATIONS

The present application is a continuation of U.S. nonprovisional application Ser. No. 11/125,858, now U.S. Pat. No. 7,773,070, filed May 9, 2005, which claims the benefit of U.S. provisional application No. 60/573,316, filed May 21, 2004, and U.S. provisional application No. 60/573,075, filed May 21, 2004, all of which are hereby incorporated by reference herein in their entirety.

TECHNICAL FIELD

The present invention relates generally to an Optical Positioning Device (OPD), and to methods of sensing movement using same.

BACKGROUND OF THE INVENTION

Pointing devices, such as computer mice or trackballs, are utilized for inputting data into and interfacing with personal computers and workstations. Such devices allow rapid relocation of a cursor on a monitor, and are useful in many text, database and graphical programs. A user controls the cursor, for example, by moving the mouse over a surface to move the cursor in a direction and over distance proportional to the movement of the mouse. Alternatively, movement of the hand over a stationary device may be used for the same purpose.

Computer mice come in both optical and mechanical versions. Mechanical mice typically use a rotating ball to detect motion, and a pair of shaft encoders in contact with the ball to produce a digital signal used by the computer to move the cursor. One problem with mechanical mice is that they are prone to inaccuracy and malfunction after sustained use due to dirt accumulation, and such. In addition, the movement and resultant wear of the mechanical elements, particularly the shaft encoders, necessarily limit the useful life of the device.

One solution to the above-discussed with mechanical mice problems has been the development of optical mice. Optical mice have become very popular because they are more robust and may provide a better pointing accuracy.

The dominant conventional technology used for optical mice relies on a light emitting diode (LED) illuminating a surface at grazing incidence, a two-dimensional CMOS (complementary metal-oxide-semiconductor) detector which captures the resultant images, and software that correlates successive images to determine the direction, distance and speed the mouse has been moved. This technology typically provides good accuracy but suffers from low optical efficiency and relatively high image processing requirements.

Another approach uses one-dimensional arrays of photosensors or detectors, such as photodiodes. Successive images of the surface are captured by imaging optics, translated onto the photodiodes, and compared to detect movement of the mouse. The photodiodes may be directly wired in groups to facilitate motion detection. This reduces the photodiode requirements, and enables rapid analog processing. An example of one such a mouse is disclosed in U.S. Pat. No. 5,907,152 to Dandliker et al.

The mouse disclosed in Dandliker et al. differs from the standard technology also in that it uses a coherent light source, such as a laser. Light from a coherent source scattered off of a rough surface generates a random intensity distribution of light known as speckle. The use of a speckle-based pattern has several advantages, including efficient laser-based light generation and high contrast images even under illumination at normal incidence. This allows for a more efficient system and conserves current consumption, which is advantageous in wireless applications so as to extend battery life.

Although a significant improvement over the conventional LED-based optical mice, these speckle-based devices have not been wholly satisfactory for a number of reasons. In particular, mice using laser speckle have not demonstrated the accuracy typically demanded in state-of-the-art mice today, which generally are desired to have a path error of less than 0.5% or thereabout.

The present disclosure discusses and provides solutions to certain problems with prior optical mice and other similar optical pointing devices.

SUMMARY OF THE INVENTION

One embodiment relates to an optical displacement sensor for sensing movement of a data input device across a surface by determining displacement of optical features in a succession of frames. The sensor includes at least an illuminator, telecentric imaging optics, and an array of photosensitive elements. The illuminator is configured to illuminate a portion of the surface. The telecentric imaging optics is configured to image the optical features emanating from the illuminated portion of the surface, and the array of photosensitive elements is configured to detect intensity data relating to the optical features imaged by the telecentric imaging optics.

Another embodiment relates to a method of sensing movement of a data input device across a surface. A portion of the surface is illuminated and images of the illuminated portion of the surface are focused to an array of photosensitive elements using telecentric imaging optics. Displacement of optical features emanating from the illuminated portion of the surface are determined in a succession of frames to sense movement of the data input device across the surface in at least one dimension.

Another embodiment relates to an optical positioning device which includes at least a laser configured to illuminate a portion of a surface, an array of photosensitive elements; telecentric imaging optics, and a signal processor. The telecentric imaging optics is configured to map a speckle pattern generated by the illuminated portion of the surface along with finite aperture imaging optics to the array of photosensitive elements, and the signal processor is configured to determine displacement of the speckle pattern in a succession of frames.

Other embodiments are also disclosed.

BRIEF DESCRIPTION OF THE DRAWINGS

These and various other features and advantages of the present disclosure are understood more fully from the detailed description that follows and from the accompanying drawings, which however, should not be taken to limit the appended claims to the specific embodiments shown, but are for explanation and understanding only, where:

DETAILED DESCRIPTION

Speckle "Boiling" Problem

One problem with prior speckle-based OPDs relates to the changing of the speckle pattern, or speckle "boiling". In general, the speckle pattern from a surface moves as the surface is moved, and in the same direction with the same velocity. However, in many optical systems there will be additional changes in the phase front coming off of the surface. For example, if the set of rays that participate in the speckle pattern formation at the detector changes as the system is moved relative to the surface, then the detected speckle pattern will change (or "boil") in a somewhat random manner instead of simply shift. This degrades the signal used to detect the surface motion (from the shift), leading to decreases in the accuracy and sensitivity of the system.

As discussed in detail below, one aspect of the present invention provides an OPD with negligible or reduced speckle boiling.

OPD Embodiments Disclosed Herein

The present disclosure relates generally to a sensor for an Optical Positioning Device (OPD), and to methods for sensing relative movement between the sensor and a surface based on displacement of a random intensity distribution pattern of light, known as speckle, reflected from the surface. OPDs include, but are not limited to, optical mice or trackballs for inputting data to a personal computer.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

Generally, the sensor for an OPD includes an illuminator having a light source and illumination optics to illuminate a portion of the surface, a detector having a number of photosensitive elements and imaging optics, and signal processing or mixed-signal electronics for combining signals from each of the photosensitive elements to produce an output signal from the detector.

In one embodiment, the detector and mixed-signal electronics are fabricated using standard CMOS processes and equipment. Preferably, the sensor and method of the present invention provide an optically-efficient detection architecture by use of structured illumination that produces uniform phase-front and telecentric speckle-imaging as well as a simplified signal processing configuration using a combination of analog and digital electronics. This architecture reduces the amount of electrical power dedicated to signal processing and displacement-estimation in the sensor. It has been found that a sensor using the speckle-detection technique, and appropriately configured in accordance with the present invention can meet or exceed all performance criteria typically expected of OPDs, including maximum displacement speed, accuracy, and % path error rates.

Introduction to Speckle-Based Displacement Sensors

This section discusses operating principles of speckle-based displacement sensors as understood and believed by the applicants. While these operating principles are useful for purposes of understanding, it is not intended that embodiments of the present disclosure be unnecessarily limited by these principles.

Figure 1A:
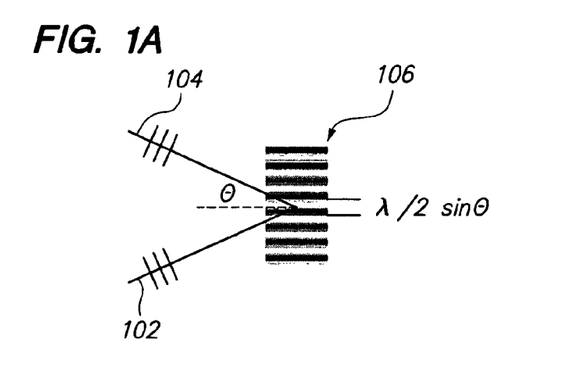
FIGS. 1A and 1B illustrate, respectively, a diffraction pattern of light reflected from a smooth surface and speckle in an interference pattern of light reflected from a rough surface.

Referring to FIG. 1A, laser light of a wavelength indicated is depicted as a first incident wave 102 and second incident wave 104 to a surface, each making an angle of incidence $\theta$ with respect to the surface normal. A diffraction pattern 106 results which has a periodicity of $\lambda/2 \sin \theta$.

Figure 1B:
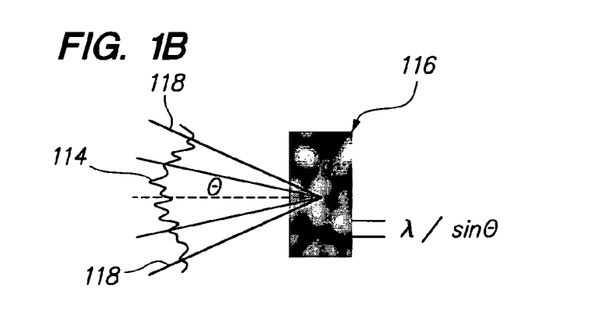

In contrast, referring to FIG. 1B, any general surface with morphological irregularities of dimensions greater than the wavelength of light (i.e. roughly >1 μm) will tend to scatter light 114 into a complete hemisphere in approximately a Lambertian fashion. If a coherent light source, such as a laser is used, the spatially coherent, scattered light will create a complex interference pattern 116 upon detection by a square-law detector with finite aperture. This complex interference pattern 116 of light and dark areas is termed speckle. The exact nature and contrast of the speckle pattern 116 depends on the surface roughness, the wavelength of light and its degree of spatial-coherence, and the light-gathering or imaging optics. Although often highly complex, a speckle pattern 116 is distinctly characteristic of a section of any rough surface that is imaged by the optics and, as such, may be utilized to identify a location on the surface as it is displaced transversely to the laser and optics-detector assembly.

Speckle is expected to come in all sizes up to the spatial frequency set by the effective aperture of the optics, conventionally defined in term of its numerical aperture $NA=\sin \theta$ as shown FIG. 1B. Following Goodman [J. W. Goodman, "Statistical Properties of Laser Speckle Patterns" in "Laser Speckle and Related Phenomena" edited by J. C. Dainty, Topics in Applied Physics volume 9, Springer-Verlag (1984)—in particular, see page 39-40.], the size statistical distribution is expressed in terms of the speckle intensity auto-correlation. The "average" speckle diameter may be defined as $$a = \frac{\lambda}{\sin \theta} = \frac{\lambda}{NA} \qquad \text{(Equation 1)}$$

It is interesting to note that the spatial frequency spectral density of the speckle intensity, which by Wiener-Khintchine theorem, is simply the Fourier transform of the intensity auto-correlation. The finest possible speckle, $a_{min}=\lambda/2NA$, is set by the unlikely case where the main contribution comes from the extreme rays 118 of FIG. 1B (i.e. rays at $\pm\theta$), and contributions from most "interior" rays interfere destructively. The cut-off spatial frequency is therefore $f_{co}=1/(\lambda/2NA)$ or $2NA/\lambda$.

Note that the numerical aperture may be different for spatial frequencies in the image along one dimension (say "x")

than along the orthogonal dimension ("y"). This may be caused, for instance, by an optical aperture which is longer in one dimension than another (for example, an ellipse instead of a circle), or by anamorphic lenses. In these cases, the speckle pattern 116 will also be anisotropic, and the average speckle size will be different in the two dimensions.

One advantage of a laser speckle-based displacement sensor is that it can operate with illumination light that arrives at near-normal incidence angles. Sensors that employ imaging optics and incoherent light arriving at grazing incident angles to a rough surface also can be employed for transverse displacement sensing. However, since the grazing incidence angle of the illumination is used to create appropriately large bright-dark shadows of the surface terrain in the image, the system is inherently optically inefficient, as a significant fraction of the light is reflected off in a specular manner away from the detector and thus contributes nothing to the image formed. In contrast, a speckle-based displacement sensor can make efficient use of a larger fraction of the illumination light from the laser source, thereby allowing the development of an optically efficient displacement sensor.

Disclosed Design for Speckle-Based Displacement Sensor

The detailed description below describes an architecture for one such laser-speckle-based displacement sensor using CMOS photodiodes with analog signal combining circuitry, moderate amounts of digital signal processing circuitry, and a low-power light source, such as, for example, a 850 nm Vertical Cavity Surface Emitting Laser (VCSEL). While certain implementational details are discussed in the detailed description below, it will be appreciated by those skilled in the art that different light sources, detector or photosensitive elements, and/or different circuitry for combining signals may be utilized without departing from the spirit and scope of the present invention.

A speckle-based mouse according to an embodiment of the present invention will now be described with reference to FIGS. 2 and 3.

Figure 2:
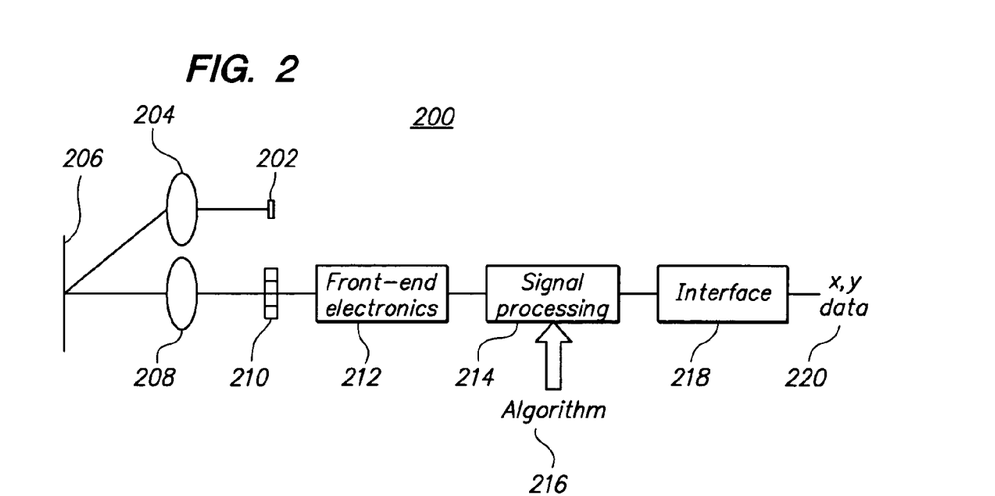
FIG. 2 is a functional block diagram of a speckle-based OPD in accordance with an embodiment of the invention.

FIG. 2 is functional diagram of a speckle-based system 200 according to an embodiment of the invention. The system 200 includes a laser source 202, illumination optics 204, imaging optics 208, at least two sets of multiple CMOS photodiode arrays 210, front-end electronics 212, signal processing circuitry 214, and interface circuitry 216. The photodiode arrays 210 may be configured to provide displacement measurements along two orthogonal axes, x and y. Groups of the photodiodes in each array may be combined using passive electronic components in the front-end electronics 212 to produce group signals. The group signals may be subsequently algebraically combined by the signal processing circuitry 214 to produce an (x, y) signal providing information on the magnitude and direction of displacement of the OPD in x and y directions. The (x,y) signal may be converted by the interface circuitry 218 to x,y data 220 which may be output by the OPD. Sensors using this detection technique may have arrays of interlaced groups of linear photodiodes known as "differential comb arrays."

Figure 3:
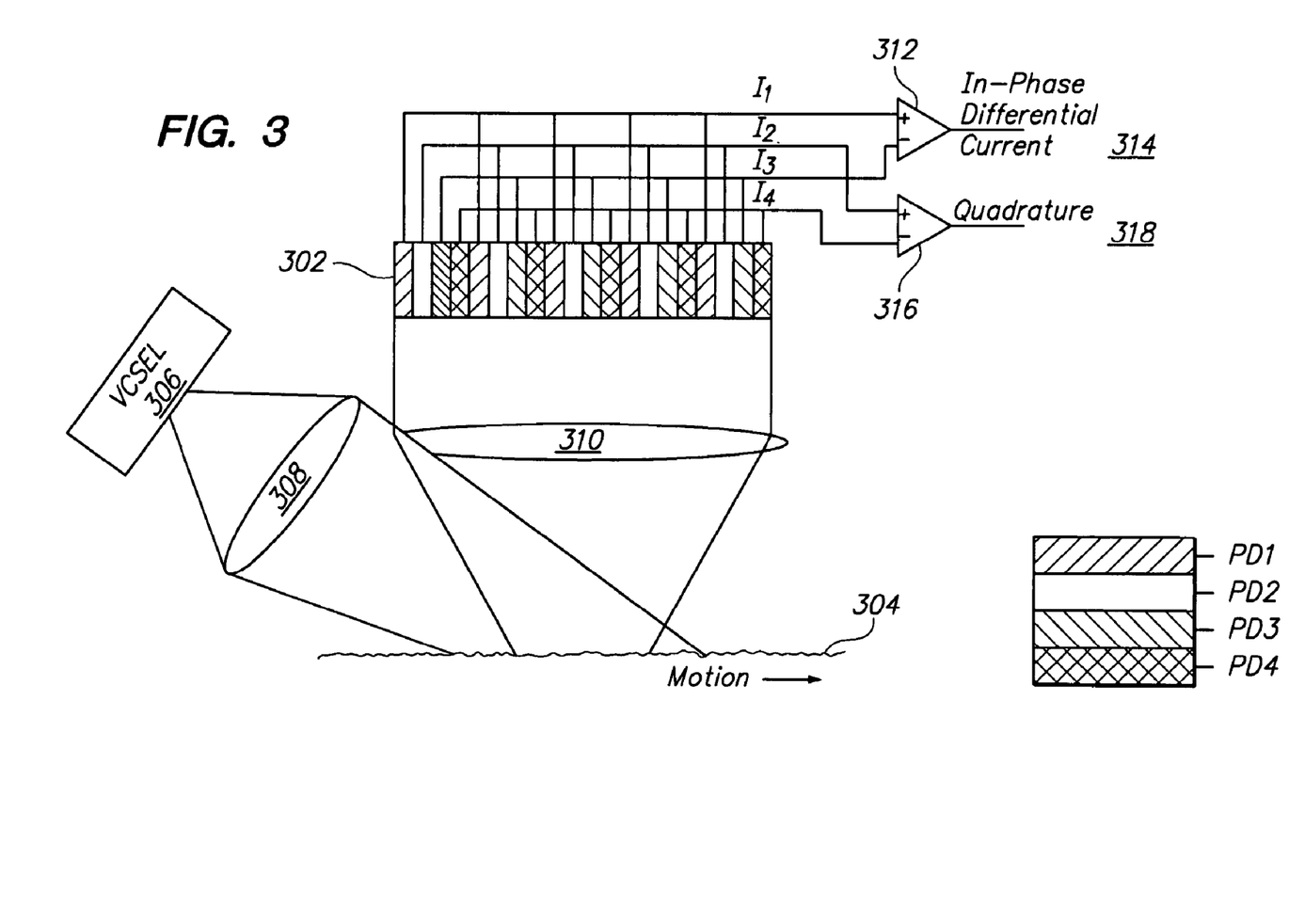
FIG. 3 is a block diagram of an array having interlaced groups of photosensitive elements in accordance with an embodiment of the invention.

FIG. 3 shows a general configuration (along one axis) of such a photodiode array 302, wherein the surface 304 is illuminated by a coherent light source, such as a Vertical Cavity Surface Emitting Laser (VCSEL) 306 and illumination optics 308, and wherein the combination of interlaced groups in the array 302 serves as a periodic filter on spatial frequencies of light-dark signals produced by the speckle images.

Speckle generated by the rough surface 304 is mapped to the detector plane with imaging optics 310. Preferably, the imaging optics 310 are telecentric for optimum performance.

In one embodiment, the comb array detection is performed in two independent, orthogonal arrays to obtain estimations of displacements in x and y. A small version of one such array 302 is depicted in FIG. 3.

Each array in the detector consists of a number, N, of photodiode sets, each set having a number, M, of photodiodes (PD) arranged to form an MN linear array. In the embodiment shown in FIG. 3, each set consists of four photodiodes (4 PD) referred to as 1, 2, 3, 4. The PD1s from every set are electrically connected (wired sum) to form a group, likewise PD2s, PD3s, and PD4s, giving four signal lines coming out from the array. Their corresponding currents or signals are $I_1$, $I_2$, $I_3$, and $I_4$. These signals (I1, $I_2$, $I_3$, and $I_4$) may be called group signals. Background suppression (and signal accentuation) is accomplished by using differential analog circuitry 312 to generate an in-phase differential current signal 314 ($I_{13}$)=$I_1$–$I_3$ and differential analog circuitry 316 to generate a quadrature differential current signal 318 ($I_{24}$)=$I_2$–$I_4$. These in-phase and quadrature signals may be called line signals. Comparing the phase of $I_{13}$ and $I_{24}$ permits detection of the direction of motion.

Preferably, to suppress the introduction of phase errors, which can translate directly into displacement error, the sensor of the present invention uses multiple comb arrays. Moreover, although the embodiments described herein use "4N" scheme for the individual arrays, the system design rationale is applicable (with appropriate modifications) for other array configurations or schemes, such as 3N, 5N, 6N, 7N, 8N, and so on. The terminology "4N" refers to a detector array in which every fourth detector is wired together, and the resulting four photocurrent signals are subtracted from each other as described in Dandliker, et al. (U.S. Pat. No. 5,907,152). However, many other groupings are possible with appropriate schemes for combining the signals.

Telecentric Imaging to Reduce Speckle Boiling Problem

The speckle pattern, such as the example shown in FIG. 1, may be use as the basis for displacement measurement where a surface undergoes a displacement relative to the measuring device, such as a speckle mouse. The displacement may be deduced from the displacement of the speckle pattern on the detector (after taking into account the effective optical magnification factor). Therefore, one factor for a successful measurement is that the speckle pattern undergo a nearly pure translation for small displacements [i.e. small compared to the detector field-of-view (FOV)], with only relatively minor changes in the pattern itself. In such situations, correlation or other signal-processing algorithms may be used to determine the physical displacement.

The change in speckle pattern comes from at least two sources. A first source of change is due to part of the surface leaving the detector FOV, while a new part is entering the detector FOV, as the detector system is displaced with respect to the surface. This source of speckle pattern change is unavoidable, but its effect be minimized by estimating the displacement in a time which is much faster than it takes the detector to move across its FOV.

A second source of speckle pattern change is due to changes of viewing angle with respect to points on the rough surface as the surface is displaced. As discussed in the present patent application, applicants note that this second source of change occurs if the imaging optics is non-telecentric on the object side (the scattering surface), meaning that the angular extent of ray depends on the field point—see FIG. 4, for example.

Figure 4:
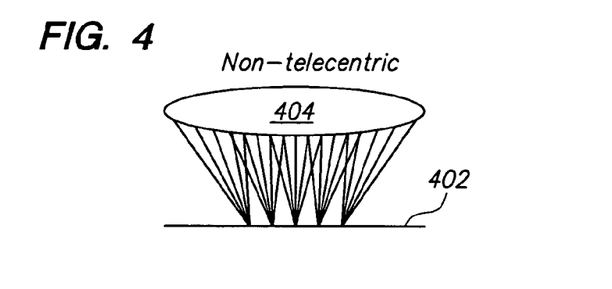
FIG. 4 is a ray diagram which shows an example non-telecentric imaging system.

The illustration in FIG. 4 shows an angular extent of several (five) illustrative contributing rays being emitted from each of several points on a surface 402 under the lens 404 of an imaging system which is non-telecentric on the object side. Consider that the rays illustrated pass through a system aperture (not illustrated) of the non-telecentric image system, and further consider that the middle ray of each set of contributing rays is a chief ray in that it passes through the center of the system aperture. As seen from FIG. 4, the angle of the chief ray with respect to the surface at each image point depends on the location of that point in the field of view. In other words, the angular extent of the contributing rays at each image point is field-point dependent.

As the detector of an object-side non-telecentric imaging system is displaced, the set of rays from a given field point that contributes to the image changes. At an undesirable extreme, a completely uncorrelated speckle would occur when the angular change is greater than or equal to twice the lens numerical aperture. In order to maintain relatively translation-invariant speckle patterns, the angular change should be less than the lens numerical aperture (NA).

Figure 5A:
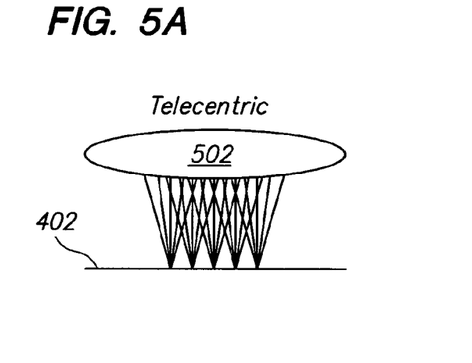
FIG. 5A is a ray diagram showing an example telecentric imaging system with chief rays normal to a surface according to an embodiment of the present invention.
Figure 5B:
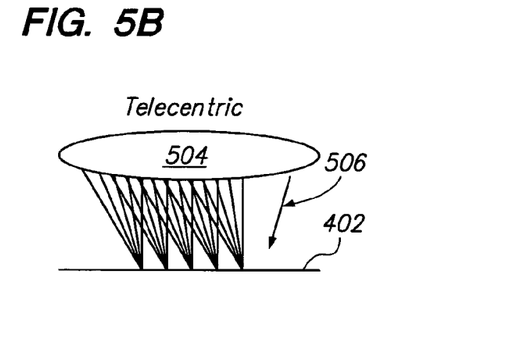
FIG. 5B is a ray diagram showing an example telecentric imaging system with chief rays at a non-normal angle to a surface according to an embodiment of the present invention.

Imaging systems which are telecentric on the object side are illustrated in FIGS. 5A and 5B. In object-side telecentric imaging, the angular-extent of the contributing rays at each image point is substantially field-point independent, and the speckle pattern is substantially translation invariant for displacements small compared to the imaging system FOV. In other words, the chief rays from each image point are parallel.

The first example in FIG. 5A shows a lens 502 for an object-side telecentric imaging system configured such that the chief rays are normal to the surface 402.

The second example in FIG. 5B shows a lens 504 of an object-side telecentric imaging system configured such that the chief rays are at a non-normal angle to the surface 402. This embodiment permits the use of the same lens 504 for illumination and imaging functions. In such a configuration, in addition to the imaging function, the lens may be used to direct illuminating rays 506 at the field of view from a different angle.

Chief rays are rays that go through the center of the system aperture. As used in the present disclosure, an imaging system is telecentric on the object side if all or a substantial majority of the chief rays coming from the object (or surface) are parallel or practically parallel. Similarly, an imaging system is telecentric on the image side if all or a substantial majority of the chief rays going toward the image (or detector) are parallel or substantially parallel.

In an object-side telecentric system, moving the object axially (along the z-axis such that the object surface moves closer to or farther from the imaging system) should result in no or little change in the magnification of the image. This is because of the chief rays being parallel, as discussed above. Moving the object axially may defocus the image, but such defocus should not be problematic when tracking movement based on movement of the speckle pattern.

In accordance with an embodiment of the invention, an optical position sensing system may be adapted to have substantially reduced speckle boiling if it is telecentric on the object side and if its illumination beam has a substantially planar phase front before it strikes the surface. In contrast, substantial speckle boiling occurs without object-side telecentric optics and/or without a uniform phase front of the illumination beam. A non-uniform phase front may be, for example, divergent.

The imaging system that is telecentric on the object side and that has a substantially planar (i.e. has a substantially uniform) phase front before it impinges the surface results in reduced speckle boiling during translation. On the other hand, the imaging system that is telecentric on the imaging side, but not on the object side, does not reduce speckle boiling during translation.

Figure 6:
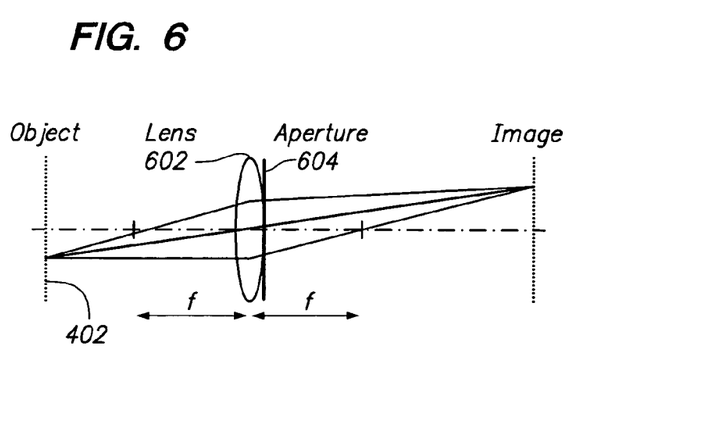
FIG. 6 is an optical diagram of a non-telecentric imaging system in which the aperture is placed at the lens location.
Figure 7:
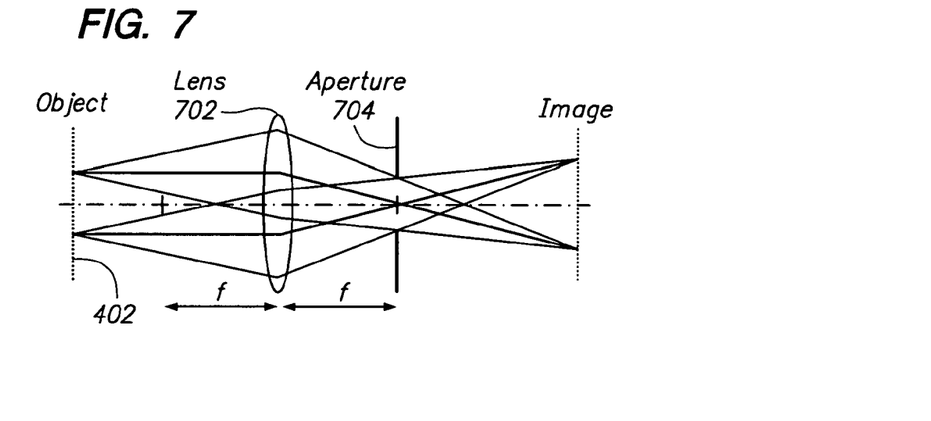
FIG. 7 is an optical diagram of an imaging system which is telecentric on the object side with chief rays normal to a surface according to an embodiment of the present invention.

FIGS. 6 and 7 show that telecentricity may be determined by the choice of aperture location in an imaging system.

FIG. 6 shows an imaging system configured such that the system aperture 604 is located immediately behind the lens 602. This is a non-telecentric system, as the chief ray (the thicker ray) goes through the lens 602 at an angle, which is different for every image point on the surface 402.

FIG. 7 shows an imaging system which is telecentric on the object side of the lens 702. In the configuration of FIG. 7, the system aperture 704 is located at the back focal plane, and all or substantially all of the chief rays are parallel (normal in this case) at the object surface 402. The back focal plane is located an optical distance away from the lens 702 equal to the focal length f of the lens. The optical distance equals the actual distance between the lens 702 and the back focal plane in a case where the medium is air or vacuum, as depicted in FIG. 7, but that if a material with an index of refraction different from one is used, then the actual distance between the lens 702 and the system aperture 704 is to be adjusted accordingly.

The object-side telecentric system illustrated in FIG. 7 has an aperture located at the back focal plane. Hence, a collimated beam from the object side should be focused and passed by the aperture efficiently. In other words, a substantial majority of the collimated beam should pass through the back focal plane aperture of the object-side telecentric system, but that is not necessarily true for a non-telecentric system.

While FIG. 7 shows an embodiment of an object-side telecentric system configured such that the chief rays are normal to the surface 402, alternate embodiments may be configured such that chief rays are at angles non-normal to the surface 402, for example, as discussed above in relation to FIG. 5B.

Figure 8:
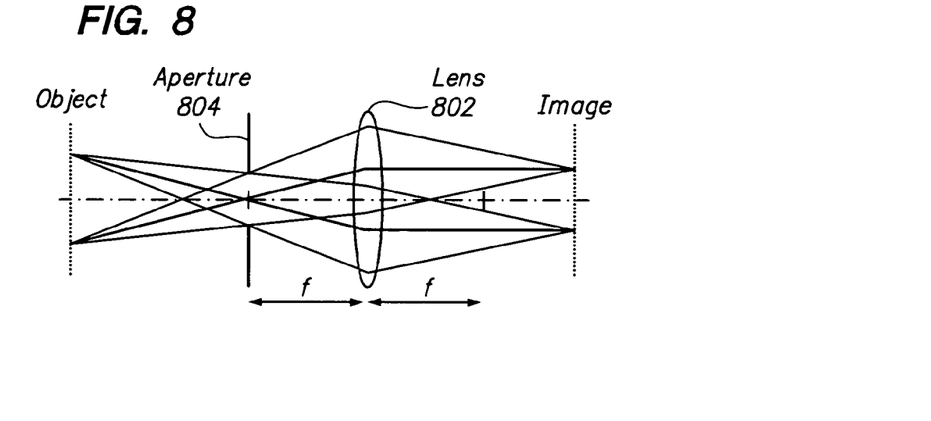
FIG. 8 is an optical diagram of an imaging system which is telecentric on the image side.

While FIG. 7 shows an imaging system which is telecentric on the object side, FIG. 8 shows an imaging system which is telecentric on the image side. In FIG. 8, the aperture 804 is located at the front focal plane of the lens 802. The system in FIG. 8 does not reduce speckle boiling during translation.

Figure 9:
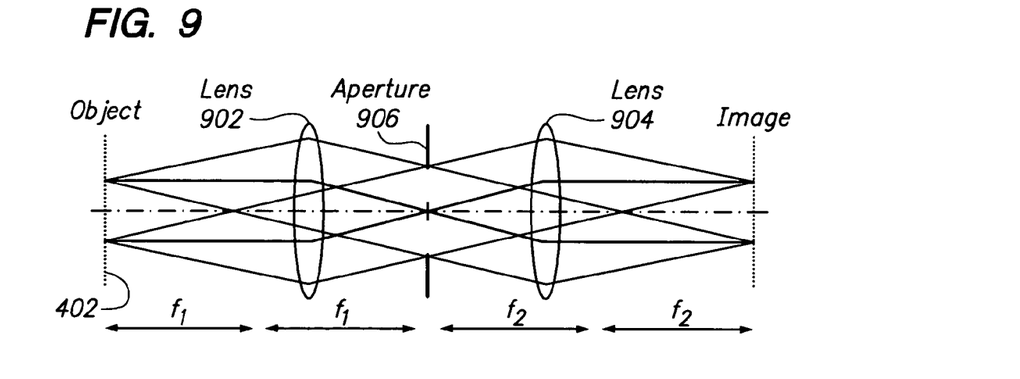
FIG. 9 is an optical diagram of an imaging system which is telecentric on both object and image sides according to an embodiment of the present invention.

A system which is telecentric on both the object and image sides is shown in FIG. 9. Here f1 and f2 are the focal lengths of the left-hand (object-side) lens 902 and right-hand lens 904, respectively. The focal length of the front lens 902 is f1, and the focal length of the back lens 904 is f2. In this configuration, the aperture 906 is located at the back focal point of the front lens 902, which coincides with the front focal point of the back lens 904. The focal lengths may be chosen such that the magnification=f2/f1 is as desired, and to meet any size constraint on the total length f1+f2.

In accordance with an embodiment of the invention, in order to maintain a speckle image which translates without changing or with very little change, an image point at the detector may be formed from the same bundle of rays as the object (surface) is translated. In other words, the angular extent of the contributing rays should be invariant or near invariant as the surface translation occurs. Such invariance is present if the optical system is telecentric on the object side, for example, as in FIG. 7 or 9. Because the aperture and lenses move with the detector, telecentricity on the image side may have some advantages but is not required.

In the above discussion, the plane of the system aperture is located where the numerical aperture of the image is defined. The aperture may comprise a purposely introduced opaque structure with transparent sections, for example, as depicted in FIGS. 7 and 9. Alternatively, the aperture may comprise a lens in the system or may comprise other means for defining such an aperture.

Optics Layout

As discussed above, telecentric imaging optics (for example, as shown in FIG. 7 or 9) may be used to produce robust speckle signals that translate substantially without changing. Such imaging optics may be combined with illumination optics to form a complete system.

Figure 10:
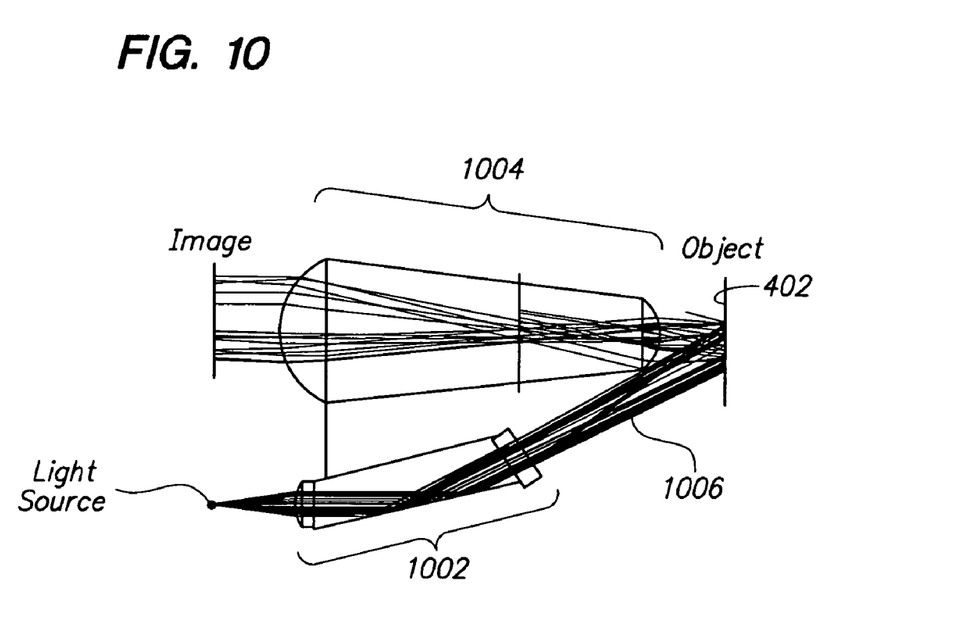
FIG. 10 is a ray diagram of a system including illumination optics and imaging optics for a sensor according to an embodiment of the present invention.

One embodiment of this combination of illumination optics 1002 and imaging optics 1004 is shown in FIG. 10. In this embodiment the illumination optics 1002 is configured such that the illumination 1006 comes at a non-zero incident angle θ with respect to the normal vector for the surface 402.

The foregoing description of specific embodiments and examples of the invention have been presented for the purpose of illustration and description, and although the invention has been described and illustrated by certain of the preceding examples, it is not to be construed as being limited thereby. They are not intended to be exhaustive or to limit the invention to the precise forms disclosed, and many modifications, improvements and variations within the scope of the invention are possible in light of the above teaching. It is intended that the scope of the invention encompass the generic area as herein disclosed, and by the claims appended hereto and their equivalents.

What is claimed is:

1. An apparatus, comprising:
    an illuminator configured to illuminate a portion of a surface using a coherent light source;
    object-side telecentric imaging optics configured to reduce speckle boiling of optical features of a speckle pattern generated by the coherent light source and emanating from the illuminated portion of the surface; and
    an array of photosensitive elements comprising a comb array, wherein the array of photosensitive elements is configured to detect intensity data relating to the optical features imaged by the object-side telecentric imaging optics.

2. The optical displacement sensor according to claim 1, wherein the optical features imaged by the object-side telecentric imaging optics are substantially invariant during translation of the surface with respect to the data input device.

3. The optical displacement sensor according to claim 1, wherein the coherent light source comprises a Vertical Cavity Surface Emitting Laser (VCSEL), and wherein the photosensitive elements comprise photodiodes.

4. The optical displacement sensor according to claim 1, wherein the object-side telecentric imaging optics is configured such that chief rays from points on the surface in a field of view are substantially parallel when the chief rays leave the surface.

5. The optical displacement sensor according to claim 4, wherein the chief rays are normal to the surface when the chief rays leave the surface.

6. The optical displacement sensor according to claim 4, wherein the chief rays leave the surface at an angle which is not normal to the surface.

7. The optical displacement sensor according to claim 1, wherein the object-side telecentric imaging optics comprises:
    an aperture; and
    a first lens located between the aperture and the illuminated portion of the surface.

8. The optical displacement sensor according to claim 7, wherein the first lens has a focal length substantially equal to an optical distance between the first lens and the aperture.

9. The optical displacement sensor according to claim 8, further comprising image-side telecentric imaging optics which comprises:
    a second lens located between the aperture and the photosensitive elements, wherein the second lens has a focal length substantially equal to the optical distance between the second lens and the aperture.

10. The optical displacement sensor according to claim 7, wherein the aperture comprises an optical element which defines a numerical aperture of light which is detected by the photosensitive elements.

11. The optical displacement sensor according to claim 10, wherein the aperture further comprises an optical element which has both a substantially transparent section and a substantially opaque section.

12. The optical displacement sensor according to claim 11, wherein the aperture has a substantially transparent section which is circular in shape.

13. The optical displacement sensor according to claim 1, wherein the optical features comprise speckle, a complex interference pattern created by light reflected from the surface, and wherein the optical displacement sensor comprises a speckle-based displacement sensor adapted to sense movement of the data input device across the surface based on displacement of the speckle pattern.

14. A method comprising:
    illuminating a portion of a surface using coherent light;
    reducing speckle boiling of a speckle pattern generated by the coherent light using object-side telecentric imaging optics;
    mapping images of the speckle pattern to an array of photosensitive elements comprising a comb array using the telecentric imaging optics; and
    determining displacement of optical features of the speckle pattern emanating from the illuminated portion of the surface in a succession of frames to sense movement of the data input device across the surface in at least one dimension.

15. The method according to claim 14, wherein the illuminating is performed by using a laser.

16. The method according to claim 14, further comprising detecting intensity data of the optical features.

17. The method according to claim 14, further comprising sensing movement of an input device relative to a surface based on the displacement of the optical features.

18. An optical positioning device comprising:
    a laser configured to illuminate a portion of the surface;
    an array of photosensitive elements;
    telecentric imaging optics on an object side configured to reduce speckle boiling of a speckle pattern from the illuminated portion of the surface and to focus the speckle pattern to the array of photosensitive elements, wherein the array of photosensitive elements comprises a comb array; and
    a signal processor configured to determine displacement of the speckle pattern in a succession of frames.

19. The optical positioning device of claim 18, wherein the object-side telecentric imaging optics comprises:
    an aperture; and
    a lens located between the aperture and the illuminated portion of the surface.

20. The optical positioning device of claim 18, wherein the illumination has a substantially uniform wave front before impinging upon the surface.

* * * * *